(12) United States Patent
Xu (10) Patent No.: US 6,496,535 B2
(45) Date of Patent: Dec. 17, 2002

(54) METHOD AND SYSTEM FOR EFFECTIVE CHANNEL ESTIMATION IN A TELECOMMUNICATION SYSTEM

(75) Inventor: Guanghan Xu, Garland, TX (US)

(73) Assignee: Navini Networks, Inc., Richardson, TX (US)

( * ) Notice: Subject to any disclaimer, the term of this patent is extended or adjusted under 35 U.S.C. 154(b) by 26 days.

(21) Appl. No.: 09/815,456

(22) Filed: Mar. 23, 2001

(65) Prior Publication Data

US 2002/0172269 A1 Nov. 21, 2002

(51) Int. Cl.$^7$ ............................. H04B 1/38; H04L 5/16
(52) U.S. Cl. ..................... 375/219; 375/220; 455/69
(58) Field of Search ........................... 375/219, 211, 375/220, 267, 347, 377; 455/69, 70, 101; 370/329, 332, 334

(56) References Cited

U.S. PATENT DOCUMENTS

| | | | | |
|---|---|---|---|---|
| 3,940,695 A | * | 2/1976 | Sickles, II | 455/69 |
| 5,471,648 A | * | 11/1995 | Gourgue | 455/63 |
| 5,481,572 A | * | 1/1996 | Skold et al. | 375/347 |
| 5,859,874 A | * | 1/1999 | Wiedeman et al. | 375/267 |
| 6,295,289 B1 | * | 9/2001 | Ionesscu et al. | 370/342 |

OTHER PUBLICATIONS

Mati Wax, Order Selection for AR Models by Predictive Least Squares, IEEE Transactions on Acoustics, Speech, and Signal Processing, vol. 36, No. 4, Apr. 1988, pp. 581–588.

\* cited by examiner

*Primary Examiner*—Mohammad H. Ghayour
(74) *Attorney, Agent, or Firm*—Haynes and Boone, LLP (57) ABSTRACT

A method and system is provided for estimating a first wireless communication channel (FWCC) transmitting a data stream from a first antenna system (FAS) to a second antenna system (SAS) in a telecommunication system, the telecommunication system having a second wireless communication channel (SWCC) for transmitting data from the MT to the antenna. First, one or more characteristics of the SWCC (SWCC Characteristics) are analyzed based on the data stream received by the antenna system from the MT. From the data stream received, an initial condition of the FWCC is also extracted. One or more characteristics of the FWCC (FWCC Characteristics) are predicted based on the SWCC Characteristics and the extracted initial condition, wherein analyzing the SWCC Characteristic and estimating the FWCC Characteristics relying on the feature that the data stream has a plurality of data segments whose Doppler frequencies are close to each other to an extent that the Doppler frequencies are deemed as the same for the purpose of analyzing the SWCC Characteristics.

44 Claims, 3 Drawing Sheets

METHOD AND SYSTEM FOR EFFECTIVE CHANNEL ESTIMATION IN A TELECOMMUNICATION SYSTEM

FIELD OF THE INVENTION

This invention relates generally to wireless communication systems having adaptive antenna arrays and more particularly to full duplex adaptive antenna arrays in mobile communication systems.

BACKGROUND OF THE INVENTION

Smart antennas, or adaptive antenna arrays, are proved to have distinct advantages in next generation wireless communication systems. The adaptive antenna array, usually deployed on a base station side of the wireless communication system, is capable of performing spatially selective communications (e.g., to transmit and receive) to optimize the signal-to-interference-and-noise-ratio (SINR) at a desirable receiving terminal, leading to significant increase of power efficiency and channel capacity on both the terminal-to-base-station (uplink) and base-station-to-terminal (downlink) communications in the wireless communication system. The basic concept of the adaptive antenna array system used in a wireless communication system can be dissected and summarized as the following four sequential steps:

(1) estimating the uplink wireless spatial signatures corresponding to all the active terminals based on the data received from the antenna array;

(2) performing the uplink beamforming for the active terminals based on the uplink spatial signatures;

(3) estimating the downlink channel characteristics or downlink spatial signatures; and (4) performing downlink beamforming based on the downlink spatial signatures.

The spatial signatures are also known or referred to as channel characteristics which represent a changing model of the communication channel involved.

For a time-division-duplex (TDD) communication system which transmits and receives information in the same carrier frequency but different time slots, the downlink spatial signatures are identical to the uplink spatial signatures if the terminal is fixed according to the reciprocity principle. However, for moving terminals, especially fast moving terminals, the uplink spatial signatures and downlink spatial signatures may not be the same due to the physical displacement of the terminal made between the uplink time slot and downlink time slot. As a matter of fact, a 5 ms separation in time can cause quite a significant change of the spatial signatures if a terminal moves at a speed above 50 miles per hour.

Therefore, in the case of dealing with a moving terminal, channel prediction techniques must be applied to predict downlink spatial signatures based on the estimated uplink spatial signatures, knowing that they will be different to a certain extent. Existing channel prediction techniques are only applicable to a single antenna system and no effective channel prediction algorithm has been proposed or known to handle the channel prediction of an antenna array system. What is needed is a method for estimating the spatial signatures or characteristics of multiple channels in a telecommunication system.

This need for estimating the spatial signatures is also important in a frequency-division-duplex (FDD) communication system. In such a system, even if the terminal is fixed, the downlink spatial signatures are significantly different from the uplink spatial signatures due to the significantly different carrier frequencies used for both the uplink and the downlink, except for a few exceptional scenarios (e.g., only one direct path with no multipath). Also, it is deemed to be practically impossible to derive the downlink spatial signatures from the uplink spatial signatures. Therefore, to effectively implement a full duplex smart antenna system, it is ideal to feedback the downlink spatial signatures continuously from the terminal to the base station. Although it seems to be a good solution, it is hardly useful in a typical mobile communication system since this scheme requires too much overhead to feedback the downlink spatial signatures to the base station especially if the downlink spatial signatures change rapidly due to a fast moving terminal.

What is needed is a feasible method and system for realizing the full duplex adaptive antenna array for a telecommunication system.

SUMMARY

In one example of the present invention, a method is disclosed for estimating a first wireless communication channel (FWCC) transmitting data from a first antenna system (FAS) to a second antenna system (SAS) in a telecommunication system. The telecommunication system has a second wireless communication channel (SWCC) for transmitting data from the SAS to FAS. First, one or more characteristics of the SWCC (SWCC Characteristics) are analyzed based on a data stream received by FAS from the SAS. An initial condition of the FWCC is also extracted from the data received. One or more characteristics of the FWCC (FWCC Characteristics) are then predicted based on the analyzed SWCC Characteristics and the extracted initial condition of the FWCC.

In another example of the present invention, a method is disclosed for estimating a first wireless communication channel (Downlink Channel) transmitting data from at least one antenna system to a communication terminal (CT) in a telecommunication system, the telecommunication system having a second wireless communication channel (Uplink Channel) for transmitting data from the CT to the antenna system. One or more characteristics of the Uplink Channel (Uplink Channel Characteristics) are analyzed based on a data stream received by the antenna system from the CT, and an initial condition of the Downlink Channel is also extracted from the data received. Based on the analyzed Uplink Channel Characteristics and the extracted initial condition of the Downlink Channel, one or more characteristics of the Downlink Channel (Downlink Channel Characteristics) are predicted.

In another example of the present invention, various channel estimation methods can be used for analyzing the Uplink Channel Characteristics and predicting the Downlink Channel Characteristics relying on the fact that the data stream has a plurality of data segments whose Doppler frequencies are close to each other to the extent that the Doppler frequencies are deemed as the same for the purpose of analyzing the Uplink Channel Characteristics.

In another example of the present invention, all the above-described techniques are applied to a telecommunication system whose antenna system is an antenna array.

In yet another example of the present invention, all the above-described techniques are applied to a telecommunication system using CDMA technologies or OFDM technologies.

The present invention can be applied to a telecommunication system communicating with a mobile terminal as well as a fixed terminal. The present invention also enables full duplex adaptive antenna array in mobile communication systems to significantly increase system capacity and coverage, and mitigate or eliminate the fast fading effect in dealing with fast moving mobiles.

DETAILED DESCRIPTION OF THE INVENTION

Channel estimation usually involves multiple parameters, with some of them are known to one side of the wireless communication system such as the base station or the terminal. The final objective for the present invention is to assess and proximate the channel characteristics based on maximum numbers of known parameters and parameters derivable therefrom.

Figure 1:
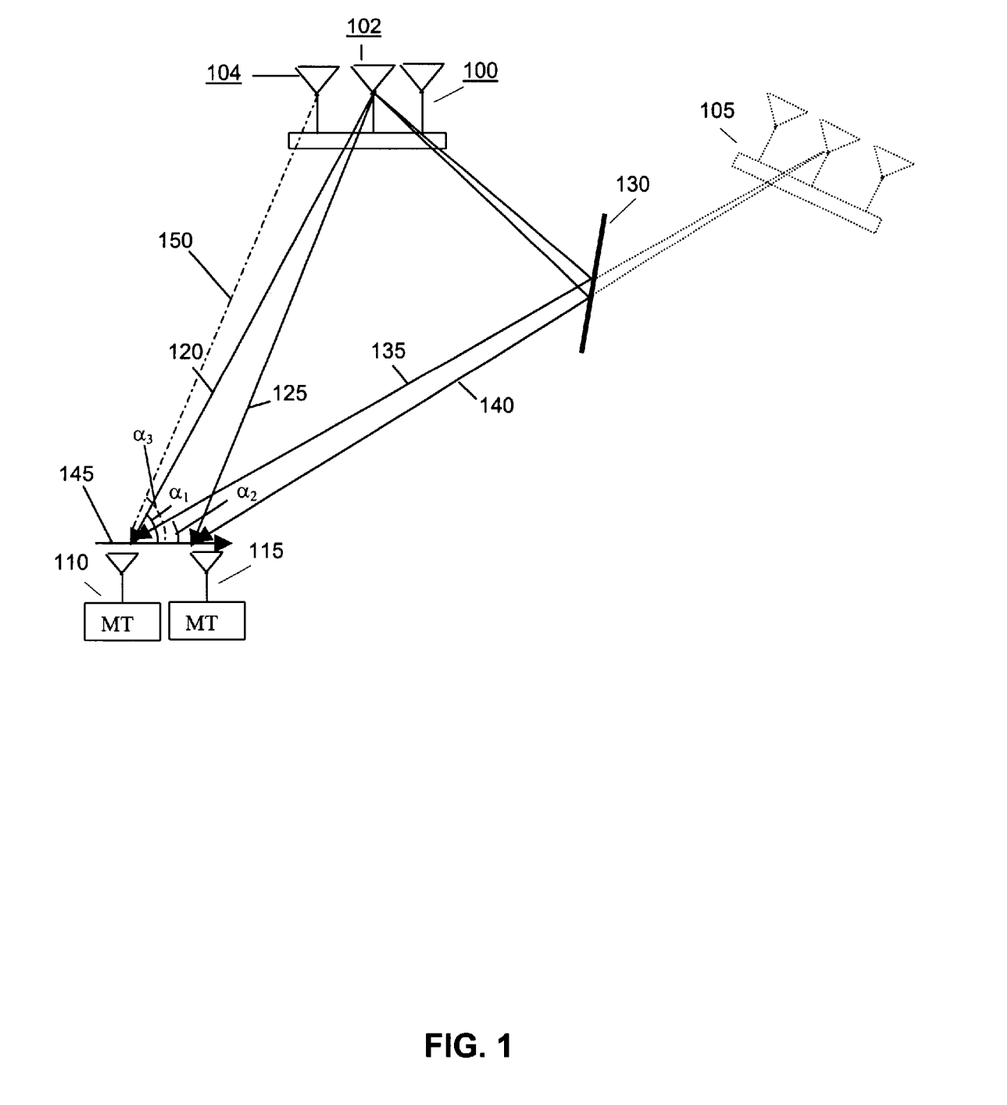
FIG. 1 shows an antenna array system and a mobile terminal in a typical mobile communication system with one direct path and a multipath component between the antenna array and the mobile terminal.

Referring now to FIG. 1, in this example, an adaptive antenna array subsystem (AAS) 100 is in wireless communication with an MT 50 at location 110 at a certain time instance. Note that the MT 50 at location 110 may include in itself an adaptive antenna array or an omni-directional antenna or a directional antenna. As illustrated, there are two communication paths from the middle antenna 102 of AAS 100 to the MT 50 at location 110, one of which is a direct path 120 and the other path is a multipath which is reflected from a plane object 130 to arrive at the MT 50. Actually, the multipath 135 may be viewed as a direct path from an image 105 of AAS 100 with regard to the plane object 130. This image 105 and the middle antenna AAS 100 are situated symmetrically on two sides of the reflection plane 130. For purposes of illustration, it is assumed that in a few seconds, the MT 50 moves from the location marked with 110 to another location marked with 115. Corresponding direct path 120 and multipath 135 also move to paths 125 and 140, respectively. Assuming that α1 and α2 are the angles between paths 120 and 125 and the moving direction 145, respectively. It is also assumed that the length of the path from AAS 100 to the MT 50 at location 110 is $L_1$ and the length from AAS 100 to MT 50 at location 115 is $L_1+\Delta L$, where $\Delta L$ is the difference between path 125 and path 120 or the path difference due to the motion. Accordingly, the relation among these parameters is defined by:

$$(L_1+\Delta L_1)^2 = L_1^2 + (v\tau)^2 - 2L_1 v\tau \cos \alpha_1 \qquad (1)$$

where v is the moving speed of the MT 50.

Since in a typical wireless communication system, the length of the path from the middle antenna of AAS 100 to MT 50 at location 110 or MT 50 at location 115 is much larger than the displacement from the location 110 to location 115, i.e., $L_1 \gg v\tau$. By ignoring the second order effect and further deriving equation (1), it is estimated that $\Delta L_1 = -v\tau \cos \alpha_1$. Using similar derivations on the multipath 135 and 140, a similar equation is obtained: $\Delta L_1 = -v\tau \cos \alpha_2$. The signal transmitted from the middle antenna of AAS 100 to MT 50 at location 110 is denoted as $s(t)e^{j2\pi ft}$, where s(t) is the baseband signal and f is the carrier frequency and t denotes time. Then the signal received by the MT 50 at location 115 will be $s(t+\tau+\Delta L_1/c)e^{j2\pi f(t+\tau+\Delta L_1/c)} = s(t+\tau+\tau \cos \alpha_1 v/c)e^{j2\pi f(t+\tau-\tau \cos \alpha_1 v/c)}$, where c is the wave travel speed. For electromagnetic waves, c is the speed of light and $v \ll c$ in typical mobile communication scenarios. Therefore, the signal received by the MT 50 at location 115 can be well approximated by $s(t+\tau)e^{j2\pi f(t+\tau)}e^{-j2\pi f \cos \alpha_1 v/c}$. The extra factor $e^{-j2\pi f \cos \alpha_1 v/c}$ is caused by the motion also known as the Doppler effect and $d_1 = f \cos \alpha_1 v/c$ is called the Doppler frequency. As it is shown, the Doppler frequency is a function of v and $\alpha_1$.

A direct path 150 also exists between the first antenna 104 of AAS 100 and the MT 50 at location 110. The angle between path 150 and moving direction 145 is $\alpha_3 = \alpha_1 + \Delta\alpha$. If it is assumed that the length of path 150 is $L_3$ and the distance between the first antenna and middle antenna 102 of AAS 100 is D. Therefore, $\Delta\alpha < \sin^{-1} D/L_3$. In typical wireless communication scenarios, $D \ll L_3$, hence $\Delta\alpha$ can be approximated by zero, or in another words, $\alpha_3$ and $\alpha_1$ are almost the same. Following the similar argument, it is concluded that as long as the antenna array size is much smaller than the length of the communication path, the angles between the path to the MT 50 and its moving direction can be approximated to be the same for different antennas. Since the Doppler frequencies are determined by the aforementioned angles, all the antennas of an antenna array system are deemed to have approximately the same set of Doppler frequencies.

For most commercial FDD cellular systems using frequencies in the 800 MHz or 1800 MHz range, the frequency difference of the uplink and downlink bands is about 5% of the carrier frequency. Therefore, the Doppler frequencies for uplink and downlink will be different by a small percentage (such as 5%) since the Doppler frequency is directly proportionally to the carrier frequency. Furthermore, the downlink Doppler frequency can also be easily derived from the uplink Doppler frequency since the exact uplink and downlink frequencies bear the following relationship:

$$d_1 = d_2 f_2/f_1, \qquad (2)$$

where $d_1$ and $d_2$ are the uplink and downlink Doppler frequencies, respectively, and $f_1$ and $f_2$ are the uplink and downlink carrier frequencies, respectively.

Figure 2:
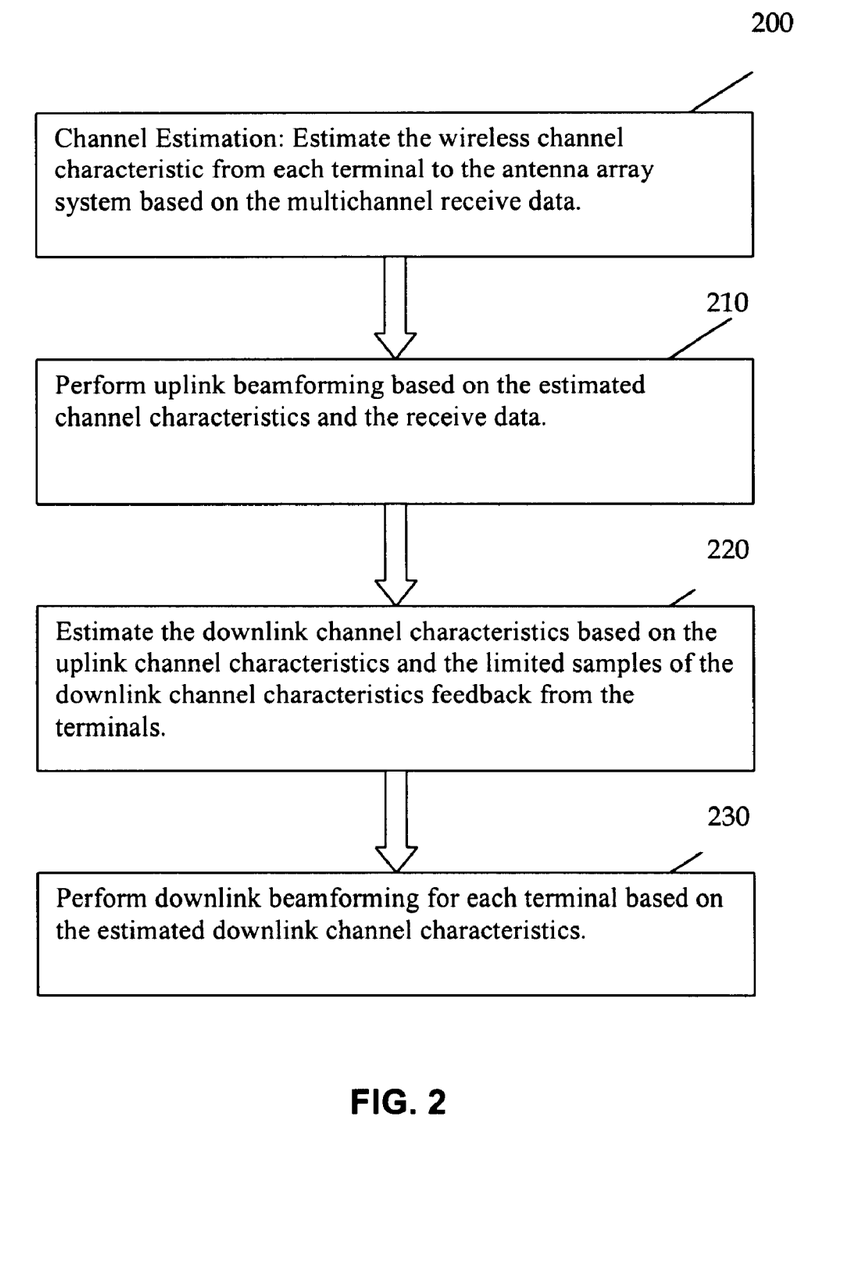
FIG. 2 shows a flow diagram illustrating steps for implementing full-duplex adaptive antenna array system in a mobile communication system according to one example of the present invention.

Now referring to FIG. 2, a method for implementing full-duplex antenna array communication systems according to one example of the present invention is shown. In the first step 200, the mobile (Doppler) channel is estimated based on the received data from multiple antennas or multiple codes (e.g., for CDMA or OFDM systems) in the uplink channel.

As described above, in a general scenario where there is an array of M antennas and a mobile terminal far away from the antenna array, the k-th channel of an antenna array can be expressed below, $$h_k(t) = \sum_{i=1}^{L} \alpha_{ki} e^{-j2\pi d_i t} \delta(t - \tau_i), \qquad (3)$$

where L is the total number of multipath components, $\delta(t)$ the impulse function, $d_i$, $\tau_i$ the Doppler frequency and time delay for the i-th multipath component, and $\alpha_{ki}$ the complex indicating the amplitude and phase shift of the i-th multipath component from the mobile terminal to the k-th antenna of the antenna array. For a narrowband system where a signal coherent time is significantly smaller than $\max\{\tau_i\}$, then the channel $h_k(t)$ can be simplified as a scalar channel below $$h_k(t) = \sum_{i=1}^{L} \alpha_{ki} e^{-j2\pi d_i t} \delta(t). \quad (4)$$

Examples of the narrowband communication systems are the Advanced Mobile Phone System (AMPS) or IS-136 (narrowband time-division-duplex-system) where the signal bandwidth is around 30 KHz. The narrowband concept can also be applied to the orthogonal frequency division multiplex (OFDM) system where the aforementioned channel characteristics is associated with one subcarrier or a small group of neighboring subcarriers.

For a wideband system such as IS-95 code-division-multiple-access (CDMA) or wideband CDMA, where the signal coherent time is comparable with the $\max\{\tau_i\}$, the above mentioned parameters can be grouped with the similar $\tau_i$ and the channel can be expressed as follows, $$h_k(t) = \sum_{i=1}^{G}\left(\sum_{n=1}^{L_{I,i}} a_{kn}^{(i)} e^{-j2\pi d_n(i)t}\right)\delta(t-\tau_i) = \sum_{i=1}^{G}\beta_k(i)\delta(t-\tau_i), \quad (4)$$

where $$\beta_k(i,t) = \sum_{n=1}^{L_{i,i}} a_{kn}^{(i)} e^{-j2\pi d_n(i)t}$$

represents a scalar channel model (or channel characteristics) corresponding to a particular delay group and G is the number of delay groups for such a channel. In a CDMA system, $\beta_k(i,t)$ corresponds to a despread value corresponding to the i-th chip delay.

For a narrowband system or each delay group of a wideband system, the scalar channel corresponding to each antenna can be simulated as a sum of complex sinusoids whose frequencies $d_n(i)$ are not the function of k, and the complex amplitude $\alpha_{kn}(i)$ are different for each antenna. In other words, although all the channels corresponding to an antenna array are different, they are formed by a linear combination of the same set of complex sinusoids. This is a powerful characteristic that can be exploited to greatly enhance the accuracy of channel estimation mechanisms. For notational convenience, the index i or (i) in the following derivations will be omitted, and the scalar channel characteristics are represented and expressed mathematically as follows, $$\beta_k(t) = \sum_{n=1}^{N} a_{kn} e^{-j2\pi d_n t}, \quad (5)$$

where N is the number of the multiple components. Since $\beta_k(t)$ is a sum of complex sinusoids and provided that the highest Doppler frequencies cannot exceed certain limit, (e.g., $d_n$=fv/c=267 Hz for f=2 GHz, v=100 mile/hour, and c=3×10$^8$ m/s), the low-pass filter $\beta_k(t)$ can be implemented with the cut-off frequency set at a point not much larger than the maximum Doppler frequencies. Consequently, a huge amount of noise and/or other high frequency interference can be filtered out to enhance the quality of channel estimation. This implementation of a low-pass filter help significantly to extract the channel characteristics from the data received from uplink channel communications.

Many channel estimation methods (such as parametric estimation method or autoregressive method) known in the industry fail to, or neglect to, consider using uplink channel characteristics to estimate the upcoming downlink characteristics due to the belief that uplink channel frequency will differ from the downlink channel frequency. They fail to recognize that a moving mobile terminal is likely to maintain its current motion for a certain period of time, and the information from the uplink channel is a rich resource for predicting the channel characteristics for the downlink. None of the known methods for making reasonable channel estimation exploits the aforementioned property that all the channels associated with different antenna elements have the common Doppler frequencies although the channels themselves are different. For the purposes of the present invention, it is understood that the Doppler frequencies are close to each other within a predetermined range, or to an extent that they have little or no effect on the mathematical equations applied. Therefore, the Doppler frequencies are deemed to be substantially the same. Using this feature, and taking Doppler channels or mobile channels into consideration, more data is now available for estimating the downlink characteristics.

Given the model represented by formula (5) above, the well-known parameter estimation method can be used to estimate $d_n$ and $\alpha_{kn}$, given $\beta_k(t)$ for k=1, . . . , K, where K is the number of antennas. However, the parameter K should not be restricted to the number of antennas. For a single antenna system, K can be the number of modes corresponding to the same mobile terminal. For example, in a CDMA system, K can be the number of code channels and $\beta_k(t)$ is the demodulated symbols for the k-th code channel of the same carrier frequency. In an OFDM system, K can be the number of closed spaced subcarriers as long as their Doppler frequencies can be approximated as the same and $\beta_k(t)$ is the demodulated symbols for the k-th subcarrier. Similarly, for a CDMA or OFDM antenna array system, K is the multiple of the number of antennas and number of code channels or subcarriers, respectively. This also includes the case that the multiple code channels in the CDMA system or the multiple OFDM subcarriers are transmitted from different closely spaced antennas or a plurality of closely spaced antennas with different weight vectors at the terminal. As it can be understood by one ordinary skilled in the art, the above signals that share the same or similar Doppler frequencies are not limited to just CDMA or OFDM signals. They can also be other types of signals such as FDMA or TDMA signals.

Fundamentally different from conventional channel estimation methods as mentioned above, which do not exploit the fact that multiple antennas share the same common Doppler frequencies, the present invention takes into consideration this critical characteristic and extracts the needed information from more data then the conventional method can while estimating the downlink channel characteristics.

For example, in the parameter estimation approach, since the $d_n$ and $\alpha_{kn}$, can be estimated, the following cost function is minimized, $$\sum_{t=0}^{T}\sum_{k=1}^{K}\left|\beta_k(t) - \sum_{n=1}^{N} a_{kn} e^{-j2\pi d_n t}\right|^2, \quad (6)$$

where t is assumed to be a discrete time index with a unity sampling rate.

According to the well-known autoregressive (AR) method (which is also considered to be a particular method of the parameter estimation method), since $\beta_k(t)$ is a sum of multiple exponentials, the following equation holds, $$\beta_k(t) + \sum_{n=1}^{N} a_n \beta_k(t-n) = 0, \quad (7)$$

where $\{a_n\}$ are a-coefficients and have the following properties, i.e., the polynomial formed by $\{a_n\}$ $$z^N + \sum_{n=1}^{N} a_n z^{N-i} = 0, \quad (8)$$

has the roots of $\{e^{-j2\pi d_n}\}$, which are only functions of the Doppler frequencies $\{d_n\}$. In this case, it is clear that the channel characteristics also depend on the historical data $\beta_k(t-n)$.

Therefore, given $\{\beta_1(t), \ldots, \beta_M(t)\}_{t=0}^{T}$, the following matrix equation can be formed:

$$B_k(N)a=0, \quad (9)$$

where $$B_k(N) = \begin{bmatrix} \beta_k(N) & \beta_k(N-1) & \ldots & \beta_k(0) \\ \beta_k(N+1) & \beta_k(N) & \ldots & \beta_k(1) \\ \vdots & \vdots & \ddots & \vdots \\ \beta_k(T) & \beta_k(T-1) & \ldots & \beta_k(T-N) \end{bmatrix}, \underline{a} = \begin{bmatrix} 1 \\ a_1 \\ \vdots \\ a_N \end{bmatrix}. \quad (10)$$

It is noted that by using the antenna array, more data is available here for analysis purposes. Each $\beta_k$ represents an antenna subsystem contained in the antenna array, and for each antenna subsystem, $\beta_k(0)$ to $\beta_k(T-N)$ represents various data points. It is understood that in a multiple access telecommunication system such as a CDMA system, $B_k$ can also be constructed by using $\beta_k$ to represent kth data segment (or data mode). Since all $\{\beta_1(t), \ldots, \beta_M(t)\}$ share the same coefficients $\{a_n\}$, the following equation also holds, $$B(N)\underline{a} = 0, B(N) = \begin{bmatrix} B_1(N) \\ \ldots \\ B_M(N) \end{bmatrix}. \quad (11)$$

Consequently, $a=[1, a_1, \ldots, a_M]$ can be estimated from solving the above equations.

By cascading $B_1(N)$ to $B_M(N)$ (i.e., integrating various antenna subsystems together), more equations or more constraints can be imposed on the a-coefficients, hence, the performance of the estimation can be significantly enhanced.

It is worth noting that $\beta_k(t)$ is a sum of complex sinusoids, and the following recursive equation also holds:

$$\overline{\beta_k(t)} + \sum_{n=1}^{N} a_n \overline{\beta_k(t+n)} = 0, \quad (12)$$

where $\overline{(.)}$ indicates complex conjugate. This is also known as the forward and backward smoothing technique. Therefore, the performance of the estimation can be further improved by stacking twice as many equations on the a-coefficients, i.e., $C(N)a=0$, where $$C(N) = \begin{bmatrix} B(N) \\ B'(N) \end{bmatrix}, B'(N) = \begin{bmatrix} B'_1(N) \\ \ldots \\ B'_M(N) \end{bmatrix},$$

and

By stacking $B(N)$ and $B'(N)$, more equations are created for producing a better estimation of a-coefficients.

One well-known method for estimating the values of a while given $B(N)$ if either $B(N)$ or $\beta_k(t)$ is noise contaminated is the least squares method. Another known method is to perform singular value decomposition on $B(N)$. In this method, the estimate of a can be obtained by selecting the right singular vector corresponding to the smallest singular value and performing proper scaling to make its first element equal to one.

With $\{a_n\}$ in place, the exponentials $\{e^{-j2\pi d_n}\}$ can be found by rooting the polynomial as in equation (8). After finding those exponentials, the least squares method can be used to find $\{\alpha_{kn}\}$ as shown below:

$()^*$ denotes conjugate transpose and $\hat{\alpha}_{kn}$ is the least squares estimate of $\alpha_{kn}$.

In the above-described method, the estimation errors of the exponentials of the Doppler frequencies are not taken into consideration. If such an estimation error of $\{e^{-j2\pi d_n}\}$ can be properly estimated, so does the estimation error variance $\sigma$ or $E^*E$ in formula (12) can be replaced by $E^*E+\sigma I$, where I is the identity matrix with dimension of N.

The next task is to estimate N based upon the $\beta_k(t)$. One example of the present invention provides a method of estimating N by forming the following matrix with p:

where $$B_k(p) = \begin{bmatrix} \beta_k(p) & \beta_k(p-1) & \ldots & \beta_k(0) \\ \beta_k(p+1) & \beta_k(p) & \ldots & \beta_k(1) \\ \vdots & \vdots & \ddots & \vdots \\ \beta_k(T) & \beta_k(T-1) & \ldots & \beta_k(T-p) \end{bmatrix}. \quad (15)$$

With the above matrix, the rank of B(p) can be detected. If the rank of B(p) is p and T is far bigger than p, then p is further increased until B(p) becomes close to rank deficient and N=rank(B(p))−1.

Another method to estimate N can be implemented based on information theoretic criteria as described in detail by Mati Wax in *Order Selection for AR Models by Predictive Least Square,* IEEE Transactions on Acoustics, Speech and Signal Processing, Vol. 36, No. 4, April, 1988, which is incorporated by reference in its entirety.

Referring back to FIG. 2, in step 210, beamforming is performed for the uplink based on the received data and the analyzed uplink channel characteristics of all co-channel signals. One effective method to enhance the uplink beamforming is to find the time varying unit-norm beamforming vectors $$\underline{\gamma}^{(i)}(t) = \begin{bmatrix} \gamma_1^{(i)}(t) \\ \vdots \\ \gamma_M^{(i)}(t) \end{bmatrix}$$

to maximize the signal-to-interference ratio $$SINR^{(i)} = \frac{|\underline{\gamma}^{(i)}(t)^* \underline{\beta}^{(i)}(t)|^2}{\sum_{p=1, p \neq i}^{L} |\underline{\gamma}^{(i)}(t)^* \underline{\beta}^{(p)}(t)|^2 + |\underline{\gamma}^{(i)}(t)^* \underline{n}(t)|^2}, \quad (16)$$

where L is the total number of co-channel signals, $\beta^{(i)}(t)$ is the channel characteristic corresponding to the i-th terminal, and n(t) is the combination of the thermal noise and other co-channel interference, e.g., from other cells.

Another method for enhancing the uplink beamforming is to maximize the signal strength, i.e., $\gamma^{(i)}(t) = \overline{\beta^{(i)}(t)}$, where $\overline{(.)}$ indicates complex conjugate. With $\gamma^{(i)}(t)$ and the data vector x(t), the uplink beamforming can be represented as below, $$y^{(i)}(t) = \gamma^{(i)}(t)^* x(t). \quad (17)$$

It is understood that with the channel characteristics and receive data vectors, other similar uplink beamforming methods well known in the industry can be used as well.

In step 220 of FIG. 2, the downlink channel characteristics need to be predicted based on the obtained uplink channel characteristics. The estimation of the downlink channel characteristics uses roughly the same techniques as those described above with regard to analyzing the uplink channel characteristics with the exception that the parameters needs to be estimated are reversed. For instance, taking equation (7) for example, in analyzing the uplink channel characteristics, $\beta_k(t)$ is known, and the parameter need to be approximated is the a-coefficients, while for predicting the downlink channel characteristics, the a-coefficients are presumed to be known from the analyzed uplink channel, and the $\beta_k(t)$ is sought instead. It is noted that for the purpose of the present invention, the a-coefficients of the uplink channel and the a-coefficients of the downlink channel are close to each other to the extent that their difference has no or little impact on mathematical derivations of other parameters in assisting the prediction of the downlink characteristics.

According to one example of the present invention, for TDD systems, since both uplink and downlink share the identical carrier frequency, they share the identical channel characteristics except for the correction of the receive calibration vector c, i.e., $\rho^{(i)}(t) = c \otimes \beta^{(i)}(t)$, where $\otimes$ denotes element wise product of two vectors. The k-th element of the vector c, $c_k$, is a ratio of the transmit complex gain (including phase offset) $g_k^{(t)}$ and receive complex gain $g_k^{(r)}$ of the k-th transceiver, i.e., $c_k = g_k^{(t)}/g_k^{(r)}$.

In order to accurately estimate the downlink channel characteristics, it is important to set or predict certain initial condition of the downlink channel. One example of the present invention uses corrected T samples of uplink channel responses $\{\rho^{(i)}(t) = c \otimes \beta^{(i)}(t)\}_{t=T_d-T}^{T_d-1}$ immediately before the downlink start time $T_d$ as the downlink channel's initial conditions from time to time. With the estimated channel parameters $\{e^{-j2\pi d_n}\}$, $\{\alpha_{kn}\}$ can then be predicted as in formula (12), where $T \geq N$. Further, the downlink channel characteristics $\{\rho_k(t)\}$ can be estimated by plugging in the estimated $\{\alpha_{kn}, e^{-j2\pi d_n}\}$ parameters to formula (6) for $t > T_d - 1$.

Another method for predicting the downlink channel characteristics is to use the recursive equation of (7), $$\rho_k(t) = -\sum_{n=1}^{N} a_n \rho_k(t-n), \quad (18)$$

given its history $\rho_k(t-n)$, the constant a-coefficients $\{a_n\}$, and functions of N Doppler frequencies $\{d_n\}$. In the immediate example, the channel prediction can be performed for $t \geq T_d$ given only the a-coefficients $\{a_n\}$ and the initial conditions of the channel characteristics $\{\rho_k(T_d-1), \ldots, \rho_k(T_d-T)\}$.

For FDD systems where the uplink and downlink carrier frequencies are different, the Doppler frequencies for the uplink can first be found and the downlink Doppler frequencies are then estimated according to equation (2). In order to find the exponentials $\{e^{-j2\pi d_n}\}$ and the downlink a-coefficients, the following steps are contemplated:

1. expanding the polynomial $$P(z) = \prod_{n=1}^{N} (z - e^{-j2\pi d_n});$$

2. using the a-coefficient of P(z) corresponding to $z^{N-n}$ for the a-coefficients $a_n$.

For PCS and cellular systems where the frequency difference is within 5% of the carrier frequency, the above calculation can be eliminated, and the uplink a-coefficients is used instead to approximate the downlink a-coefficients.

With the exponentials or a-coefficients $\{a_n\}$ collected (referred to as channel parameters), it may still be hard to perform channel prediction since the initial conditions of the downlink channel characteristics (i.e., $\rho^{(i)}(T_d-T)$, $\rho^{(i)}(T_d-T+1), \ldots, \rho^{(i)}(T_d-1)$, $T \geq T_d$) remain unclear. In one example of the present invention, a feedback method is employed to feedback the downlink channel characteristics from the mobile terminals periodically, therefore providing a close-to-real initial condition at that time instance.

Figure 3:
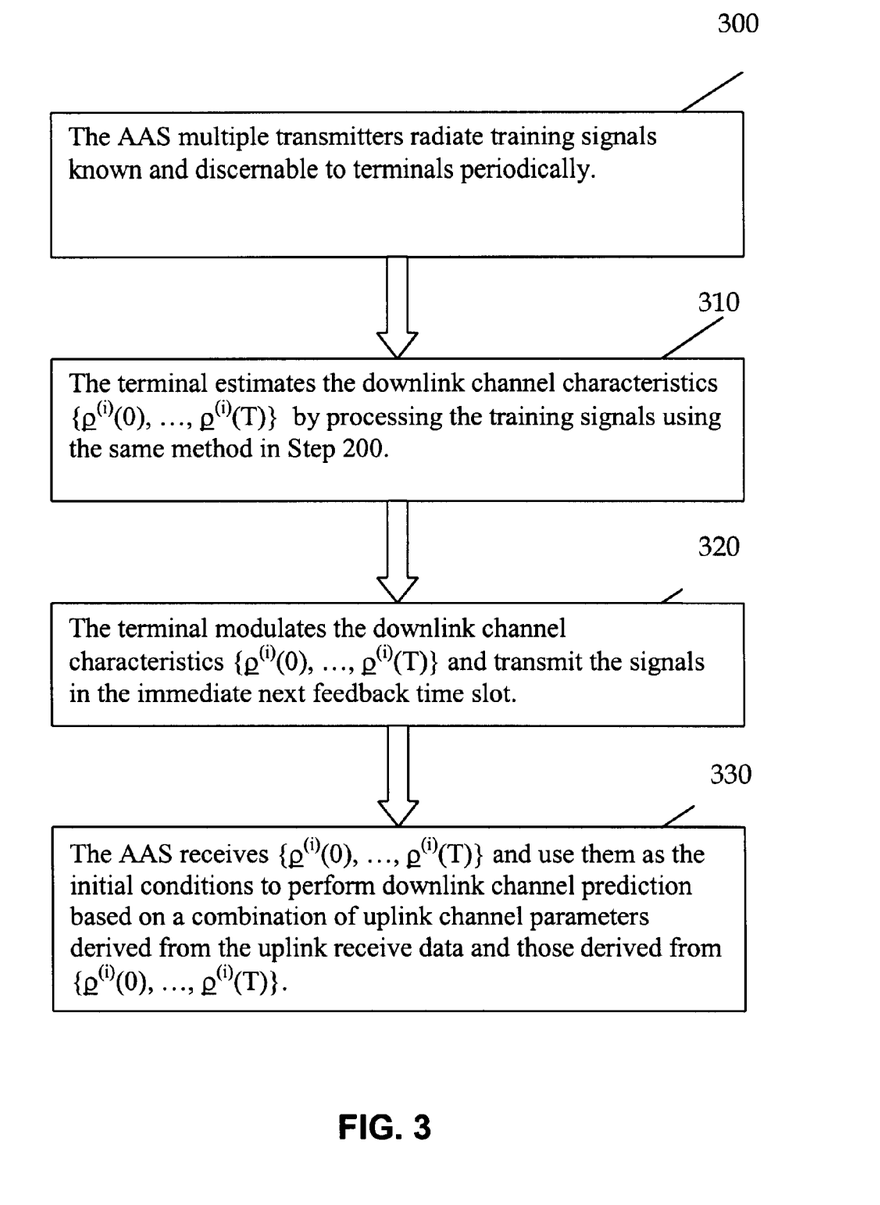
FIG. 3 shows a detailed diagram of channel estimation procedure according one example of the present invention.

Referring now to FIG. 3, detailed procedures for using the feedback method for providing initial conditions of the downlink channel periodically is shown.

Execution begins in step 300, where the AAS transmits multiple training signals known and discernable to the MT. In one example, M signals are transmitted from the M antennas of the AAS. Based on the training signals transmitted, the downlink channel characteristics are found in step 310. For instance, the i-th MT receives all these training signals and can easily estimate the channel characteristics corresponding to all the M antennas $\{\rho^{(i)}(T_d-T), \rho^{(i)}(T_d-T+1), \ldots, \rho^{(i)}(T_d-1)\}$ predicated on the sum of these signals. One way to make the training signal distinctive is to make all the antennas of the AAS transmit M mutually orthogonal signals. If the k-th signal or code is used at the MT to despread the received training signal, its component corresponding to the k-th antenna or transmitter can be readily extracted.

In another example of the present invention, the same training signal can be scheduled to be transmitted from different antennas in different time slots so that the i-th MT can easily separate and identify the training signals (or downlink channel characteristics) from different antennas or transmitters.

Further in step 320 of FIG. 3, the i-th MT modulates the T samples of the downlink channel characteristics $\{\rho^{(i)}(T_d-T), \rho^{(i)}(T_d-T+1), \ldots, \rho^{(i)}(T_d-1)\}$ and transmits them back to the AAS in the next available time slot designated for the feedback signals. In step 330, the AAS receives the downlink channel characteristics and use them as initial conditions for future channel prediction. The AAS knows the exact transmit time of the training signals and the receiving time of the feedback signal, and it ensures that the feedback signals are appropriately applied for the initial conditions. Of course, the AAS can also use $\{\rho^{(i)}(T_d-T), \rho^{(i)}(T_d-T+1), \ldots, \rho^{(i)}(T_d-1)\}$ along with the uplink data to estimate the downlink channel parameters since there are many more data samples from the uplink communications. Henceforth, with $\{\rho^{(i)}(T_d-T), \rho^{(i)}(T_{-T+1}), \ldots, \rho^{(i)}(T_d-1)\}$ and the downlink channel parameters, the same aforementioned methods as in the TDD systems can be used to predict the downlink channel characteristics. Clearly, the use of feedback signals are universally applicable in order to enhance the accuracy of the channel estimation.

Referring again to FIG. 2, with the predicted downlink channel characteristics of all the MTs, in step 230, the downlink beamforming is performed to maximize the strength or the SINR of the signal at the desired MT. In one example, a unit-norm downlink beamforming vector $\eta^{(i)}(t)$ is found such that $$SINR^{(i)} = \frac{|\underline{\eta}^{(i)}(t)^*\underline{\rho}^{(i)}(t)|^2}{\sum_{p=1,p\neq i}^{L} |\underline{\eta}^{(p)}(t)^*\underline{\rho}^{(i)}(t)|^2}, \quad (19)$$

is maximized, where $\eta^{(i)}(t)$ and $\rho^{(i)}(t)$ are the downlink beamforming vectors and channel characteristics for the i-th terminal.

Another approach for performing downlink beamforming is to maximize the signal strength at the i-th terminal, i.e., $\eta^{(i)}(t)=\overline{\rho^{(i)}(t)}$. In this case, the downlink beamforming is performed as follows, $$z(t) = \sum_{i=1}^{L} \underline{\eta}^{(i)}(t)s^{(i)}(t), \quad (20)$$

where L is the number of co-channel terminals and $s^{(i)}(t)$ is the signal for the i-th MT.

For illustration purposes, the above disclosure of the present invention is explained in the context of using an adaptive antenna array station in a telecommunication system. However, as mentioned in various places, it is understood that the techniques disclosed can be equally applied to a single antenna system, especially for telecommunication systems using OFDM and CDMA technologies, in which a group of subcarriers or code channels respectively can provide data from multiple channels to the antenna.

In addition, the above-disclosed examples of the present invention specifically explore the scenario of communicating with a mobile terminal. It is also understood, various analyses for the uplink channel characteristics and estimation for the downlink channel can be easily applied to deal with a fixed terminal due to the need that certain changes of its surrounding environment may very likely cause corresponding variations of its channel characteristics.

Thus, what has been illustrated above is a new effective method to implement the full-duplex adaptive antenna array systems for mobile communications. By effectively estimating both the uplink and downlink channel characteristics, the downlink beamforming process is significantly enhanced. It is understood that the same type of intelligence can be used in a reversed manner. That is, instead of having the base stations predict the downlink characteristics based on the analyzed and estimated uplink characteristics, the communication terminal such as the cell phone can also estimate and analyze the downlink characteristics in order to predict future uplink characteristics.

The above disclosure provides many different embodiments, or examples, for implementing different features of the invention. Also, specific examples of components, and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention.

What is claimed is:

1. A method for estimating a first wireless communication channel (FWCC) transmitting data from a first antenna system (FAS) to a second antenna system (SAS) in a telecommunication system, the telecommunication system having a second wireless communication channel (SWCC) for transmitting data from the SAS to FAS, the method comprising:

analyzing one or more characteristics of the SWCC (SWCC Characteristics) based on a data stream received by FAS from the SAS;

extracting an initial condition of the FWCC from the data received; and predicting one or more characteristics of the FWCC (FWCC Characteristics) based on the analyzed SWCC Characteristics and the extracted initial condition of the FWCC.

2. The method of claim 1 wherein the SAS is a part of a moving mobile terminal.

3. The method of claim 1 wherein the steps of analyzing and predicting use a plurality of data segments of the data stream whose Doppler frequencies are deemed as substantially the same for the purpose of analyzing the SWCC Characteristics.

4. The method of claim 3 wherein each data segment is received by a single antenna subsystem if FAS uses an antenna array.

5. The method of claim 3 wherein each data segment is received through a code channel if the telecommunication system uses CDMA technologies.

6. The method of claim 3 wherein each data segment is received from one of a plurality of antennas of the SAS.

7. The method of claim 3 wherein each data segment is received from one beamformed version of an antenna array of the SAS.

8. The method of claim 3 wherein each data segment is received through a sub-carrier frequency if the telecommunication system uses OFDM technologies.

9. The method of claim 1 wherein the step of analyzing further comprises using an autoregressive method incorporating at least one predetermined data matrices formed by a plurality of data segments.

10. The method of claim 1 wherein the data stream contains a response signal stream sent by the SAS immediately before transmitting data through the FWCC responding to at least one prior training signal.

11. The method of claim 1 wherein the step of analyzing further comprises implementing a low-pass filter for extracting the SWCC Characteristics without being interfered by noises of high frequencies.

12. The method of claim 1 wherein the step of analyzing further comprises using a parametric estimation method taking into consideration of one or more Doppler frequencies of the received data stream.

13. The method of claim 12 wherein the step of analyzing further comprises forward and backward smoothing to enhance analyzing the SWCC Characteristics, which further enhances the prediction of the FWCC Characteristics.

14. The method of claim 1 wherein the step of extracting further comprises using the SWCC to estimate the initial condition of the FWCC.

15. The method of claim 1 wherein the step of predicting further comprises estimating a Doppler frequency of the FWCC from a corresponding Doppler frequency of the SWCC based on carrier frequencies for the FWCC and the SWCC.

16. The method of claim 1 wherein the step of predicting further comprises using a-coefficients of the SWCC as the a-coefficients of the FWCC when carrier frequencies of the SWCC and the FWCC are deemed to be substantially the same for the purpose of predicting the FWCC Characteristics.

17. The method of claim 1 further comprising performing beamforming for the FWCC by finding time varying unit-norm beamforming vectors to maximize a signal to interference ratio.

18. The method of claim 1 further comprising performing beamforming for the SWCC based on the predicted SWCC Characteristics.

19. A method for channel estimation for a telecommunication system using an antenna array, the antenna array containing a plurality of antenna subsystems, the method comprising:
   analyzing one or more characteristics of a wireless communication uplink channel (Uplink Channel Characteristics) based on data received by all antenna subsystems from a mobile terminal (MT);
   extracting information for an initial condition of a wireless communication downlink channel; and
   predicting one or more characteristics the wireless communication downlink channel (Downlink Channel Characteristics) based on the Uplink Channel Characteristics and the extracted initial condition of the downlink channel,
   wherein the wireless communication uplink channel transmits data from the MT to the antenna array, and the wireless communication downlink channel transmits data from the antenna array to the MT, and
   wherein the step of analyzing and predicting utilizing a common feature that a Doppler frequency of each mobile channel established between an antenna subsystem and the MT is close to that of other mobile channels between other antenna subsystems and the MT to the extent that all the Doppler frequencies are deemed as the same frequency.

20. The method of claim 19 wherein the steps of analyzing further comprise the step of implementing a low-pass filter for extracting the Uplink Channel Characteristics without being interfered by noises and undesired signals of high frequencies.

21. The method of claim 19 wherein the step of analyzing further comprises analyzing the mobile channels based on the data received.

22. The method of claim 19 wherein the step of extracting further comprises the steps of:
   providing a training signal periodically from each antenna subsystem to the MT;
   deriving the Downlink Channel Characteristics by the MT based on the training signals; and
   transmitting from the MT to the antenna array the derived Downlink Channel Characteristics.

23. The method of claim 22 wherein each training signal is orthogonal to the others.

24. The method of claim 19 wherein the step of analyzing further comprises using a parameter estimation method integrated with forward and backward smoothing mechanisms.

25. The method of claim 19 wherein the step of analyzing further comprises using a parameter estimation method considering that all the Doppler frequencies are deemed as substantially the same.

26. The method of claim 19 wherein the step of analyzing further comprises using an autoregressive method incorporating at least one predetermined data matrices formed by a plurality of data segments.

27. The method of claim 19 wherein the step of extracting further comprises using the uplink channel to estimate the initial condition of the downlink channel.

28. The method of claim 19 wherein the step of predicting further comprises estimating a Doppler frequency of the downlink channel from a corresponding Doppler frequency of the uplink channel based on carrier frequencies for the downlink channel and the uplink channel.

29. The method of claim 19 wherein the step of predicting further comprises using a-coefficients of the uplink channel as the a-coefficients of the downlink channel when carrier frequencies of the uplink channel and the downlink channel are close to each other to an extent that they are deemed as the same for the purpose of predicting the Downlink Channel Characteristics.

30. The method of claim 19 further comprising performing beamforming for the downlink channel based on the predicted Downlink Channel Characteristics.

31. An intelligent antenna system for estimating a first wireless communication channel (FWCC) transmitting data from a first antenna system (FAS) to a second antenna system (SAS) in a telecommunication system, the telecommunication system having a second wireless communication channel (SWCC) for transmitting data from the SAS to FAS, the system comprising:
   means for analyzing one or more characteristics of the SWCC (SWCC Characteristics) based on a data stream received by FAS from the SAS;
   means for extracting an initial condition of the FWCC from the data received; and
   mean for predicting one or more characteristics of the FWCC (FWCC Characteristics) based on the analyzed SWCC Characteristics and the extracted initial condition of the FWCC.

32. The system of claim 31 wherein the SAS is a part of a moving mobile terminal.

33. The system of claim 31 wherein the means for analyzing uses a plurality of data segments of the data stream whose Doppler frequencies are deemed as substantially the same for the purpose of analyzing the SWCC Characteristics.

34. The system of claim 33 wherein each data segment is received by a single antenna subsystem if FAS uses an antenna array.

35. The system of claim 33 wherein each data segment is received through a code channel if the telecommunication system uses CDMA technologies.

36. The system of claim 33 wherein each data segment is received through a sub-carrier frequency if the telecommunication system uses OFDM technologies.

37. The system of claim 31 wherein the data stream contains a response signal stream sent by the SAS immediately before transmitting data through the FWCC responding to at least one prior training signal.

38. The system of claim 31 wherein the means for analyzing further comprises a low-pass filter implemented for extracting the SWCC Characteristics without being interfered by noises.

39. The system of claim 31 wherein the means for analyzing further comprises means for using a parametric estimation method taking into consideration of one or more Doppler frequencies of the received data stream.

40. The system of claim 39 wherein the means for analyzing further comprises means for forward and backward smoothing to enhance analyzing the SWCC Characteristics and predicting the FWCC Characteristics.

41. The system of claim 31 wherein the means for analyzing further comprises using an autoregressive method incorporating at least one predetermined data matrices formed by a plurality of data segments.

42. The method of claim 31 wherein the means for extracting further comprises using the SWCC to estimate the initial condition of the FWCC.

43. The system of claim 31 wherein the means for predicting further comprises means for estimating a Doppler frequency of the FWCC from a corresponding Doppler frequency of the SWCC based on carrier frequencies for the FWCC and the SWCC.

44. The system of claim 31 wherein the means for predicting further comprises means for using a-coefficients of the SWCC as the a-coefficients of the FWCC when carrier frequencies of the SWCC and the FWCC are close to each other within a predetermined range that they are deemed as substantially the same for the purpose of predicting the FWCC Characteristics.

* * * * *